No. 638,708. Patented Dec. 12, 1899.
O. HANSEN & A. P. NELSEN.
HEATING APPARATUS.
(Application filed Mar. 24, 1899.)
(No Model.)
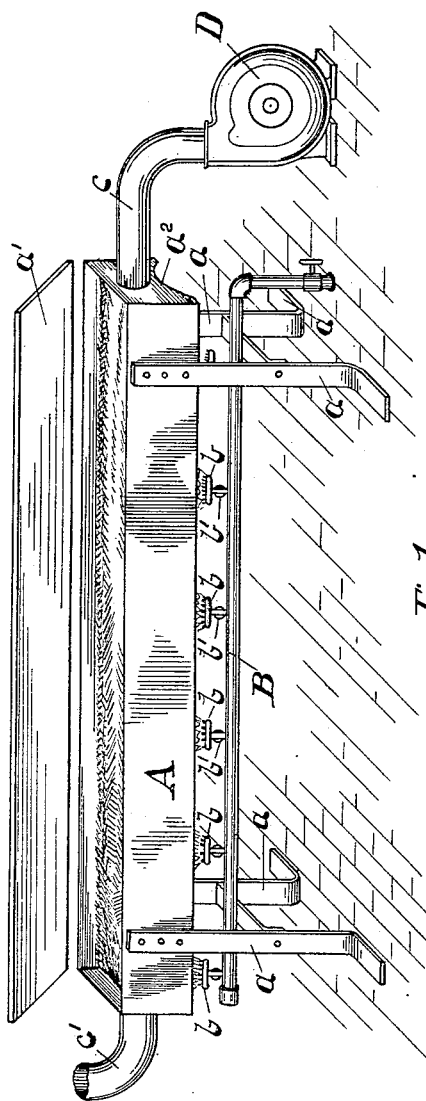
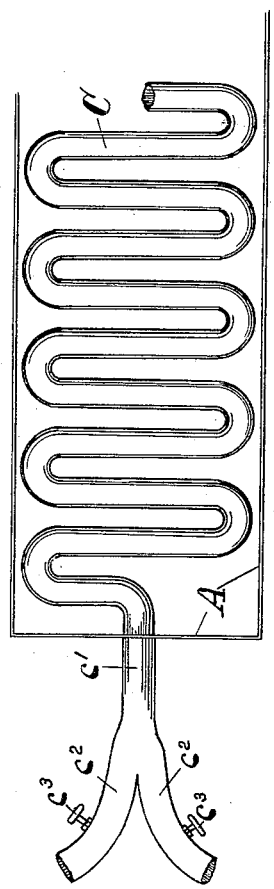
Witnesses.
Howard M Cox
Arthur M. Cox
Inventors.
Otto Hansen and
Anton P. Nelsen.
By Jesse Cox
Attorney.

UNITED STATES PATENT OFFICE.

OTTO HANSEN, OF MONT CLARE, AND ANTON P. NELSEN, OF CHICAGO, ILLINOIS.

HEATING APPARATUS.

SPECIFICATION forming part of Letters Patent No. 638,708, dated December 12, 1899.

Application filed March 24, 1899. Serial No. 710,289. (No model.)

*To all whom it may concern:*

Be it known that we, OTTO HANSEN, residing at Mont Clare, and ANTON P. NELSEN, residing at the city of Chicago, in the county of Cook, State of Illinois, citizens of the United States, have invented a new and useful Heating Apparatus, of which the following is a specification.

Our invention relates to improvements in heating apparatus in which air is heated by its passage through preferably bent or coiled pipes; and the objects of our invention are, first, to subject a current of air to a heating process and distribute said heated air, and, second, to inclose the pipe within which said air is heated in a chamber containing heating material, whereby a substantially stable temperature may be maintained in said pipe. We attain these objects by the mechanism illustrated in the accompanying drawings, in which—

Figure 1 is a view in perspective of the entire device, showing the blower, the heating-chamber with its cover removed, and the discharge-pipe. Fig. 2 is a top view of a portion of the heating-chamber, showing the air-pipe therein.

Similar letters refer to similar parts throughout both views.

The heating-chamber A is a box or receptacle, preferably made of sheet metal, and has the supports $a\ a\ a\ a$ and the cover $a'$. The bottom $a^2$ of said chamber A is concave in order to better retain the heat from the burners $b\ b$. Said burners $b\ b$ are supplied with the valves $b'\ b'$ and are attached to and supplied with fuel by the pipe B, extending beneath the chamber A at a short distance therefrom.

Within the chamber A and slightly raised from the bottom $a^2$ thereof is a pipe C, preferably of metal, and coiled or bent in such a manner as to afford maximum length within said chamber without coming into contact therewith and leaving a small space between the coils or bends of said pipe C.

The extremity $c$ of the pipe C extends beyond the chamber A and is connected with the blower or fan D, which is made in any usual manner. The opposite extremity $c'$ of said pipe is connected with the distributing-pipes $c^2\ c^2$ provided with the air gates or valves $c^3\ c^3$.

In the operation of the device when it is desired to supply hot air to the distributing-pipes $c^2$ a quantity of heat-conducting material, preferably sand or fine gravel, is introduced into the chamber A in sufficient quantity to cover the pipe C. The cover $a'$ is put in place upon said chamber and the burners $b\ b$ lighted. The heat from said burners gradually raises the temperature of the sand or other conducting material within the chamber A and causes the heating of the pipe C. The fan or blower D is set in operation and forces air through the hot pipe C, and the air after becoming heated by contact with said pipe is forced by said blower into the distributing-pipes $c^2\ c^2$.

We prefer to use a bath of sand or gravel on account of its heat-retaining properties.

By the use of such bath the temperature of the discharged air is not greatly influenced by fluctuations in the exterior heat-supply.

In its operation our device is safe, clean, economical, and requires little attention. The temperature of the heated discharged air may be easily regulated by varying the number of burners in use.

In order to present greater surface to the heat-generators and also for convenience, the chamber A is made comparatively shallow and is placed in a horizontal position, as shown; but it is evident that the form and shape of the chamber A and pipe C and the method of passing air through said pipe may be considerably varied without departing from our invention. The same is also true of the method of heating the chamber A.

What we claim as new, and desire to secure by Letters Patent, is—

A heating apparatus consisting of a chamber or box having its greatest dimensions substantially horizontal, and having a continuous bottom concave from beneath; a heat-retaining and heat-conducting bath of sand, or other substance, within said chamber or box; a bent or coiled pipe lying in a substantially horizontal position within, and extending through said chamber or box, and surrounded by said bath; a fan, or blower, whereby a current of air may be forced through said pipe; and means placed beneath said box for heating the same.

OTTO HANSEN.
ANTON P. NELSEN.

Witnesses:
ARTHUR M. COX,
HOWARD M. COX.